United States Patent [19]

Pierce et al.

[11] Patent Number: 4,720,388

[45] Date of Patent: Jan. 19, 1988

[54] METHOD FOR PEELING FRESH FRUITS

[75] Inventors: Frank D. Pierce, Pacific Grove; Bradford E. Knickerbocker, Piedmont; Don H. Lenker, Salinas, all of Calif.

[73] Assignee: Castle & Cooke, Inc., San Francisco, Calif.

[21] Appl. No.: 821,267

[22] Filed: Jan. 22, 1986

[51] Int. Cl.⁴ .......................... G01N 7/22; A23P 1/00; B26D 5/00

[52] U.S. Cl. .................................. 426/231; 83/404.2; 83/404.3; 99/590; 426/482; 426/518

[58] Field of Search ............... 426/481, 482, 518, 231; 99/546, 543, 545, 590, 589; 83/404, 404.2, 404.3

[56] References Cited

U.S. PATENT DOCUMENTS

| | | | |
|---|---|---|---|
| 1,039,926 | 10/1912 | Ginaca | 99/590 |
| 1,060,750 | 5/1913 | Ginaca | 99/590 |
| 3,073,366 | 1/1983 | Sawyer, Jr. et al. | 99/590 |
| 3,473,588 | 10/1969 | Loveland | 426/482 |
| 3,780,641 | 12/1973 | Hole | 426/482 |
| 4,109,021 | 8/1978 | Loveland | 426/482 |
| 4,546,545 | 10/1985 | Hirano | 99/543 |

OTHER PUBLICATIONS

Dole Perfect Peeler—Brochure No. DFP-33387-CC-F—358.
Dole Perfect Peeler—Brochure No. DPP-456.

Primary Examiner—George Yeung
Attorney, Agent, or Firm—Majestic, Gallagher, Parsons & Siebert

[57] ABSTRACT

The invention is directed to a system for peeling an object having a generally soft interior portion surrounded by a generally hard external surface, where the system is suitable for use by consumers or in areas with consumers. According to one aspect of the invention, the apparatus of the invention includes a knife means for removing the hard external surface from the object, leaving substantially the soft interior portion. The apparatus also includes a housing enclosing the knife means to protect consumers or an operator of the apparatus from the knife means. The housing has two openings, one for receiving the object and one for discharging the soft interior portion after the object has been peeled.

For some objects to be peeled, such as pineapples, the hard external surface of the object has two end portions and an intermediate body portion. According to another aspect of the invention, the apparatus of the invention includes a first knife means and means for grappling the object and rotating it towards the first knife means for severing the two end portions of the external surface. The apparatus also includes a second knife means and means for urging the object towards the second knife means to sever the intermediate body portion of the external surface.

3 Claims, 14 Drawing Figures

METHOD FOR PEELING FRESH FRUITS

BACKGROUND OF THE INVENTION

This invention relates in general to peeling systems, and more particularly to systems for peeling objects with soft interiors but hard external surfaces, such as fresh fruits.

In recent years the public has become much more inclined towards healthier diets. Consequently, increasingly greater amounts of fresh fruits and vegetables have been consumed. It is therefore desirable to provide systems for peeling fresh fruits, particularly fruits with hard external surfaces such as pineapples. Since fresh fruits are best consumed right after peeling, it is desirable that the peeling systems be suitable for use by consumers. For this reason the peeling system should be simple to operate. Preferably these systems should also be designed so that it is easy to clean, maintain and repair. Since these systems are likely to be located in either homes or in areas frequented by the public often including young children, it is desirable that these systems incorporate safety features to prevent the public, particularly young children, from accidental injuries.

Many conventional peeling systems have been used. Most of these systems, however, are intended for manufacturing usage in factories and involve bulky and complex machinery. Expert knowledge is usually required to operate, maintain and repair such systems. In some conventional systems, such as those disclosed in U.S. Pat. Nos. 4,109,021 and 3,473,588 both to Loveland, for peeling pineapples, the pineapple is peeled in several stages at different locations. These conventional systems are therefore not suitable for use by consumers or in retail stores by lay operators. Furthermore, none of the conventional peeling devices includes safety features to prevent the operator or the public from accidental injury.

SUMMARY OF THE INVENTION

The invention is directed to a system for peeling an object having a generally soft interior portion surrounded by a generally hard external surface, where the system is suitable for use by consumers or in areas with consumers. According to one aspect of the invention, the apparatus of the invention includes a knife means for removing the hard external surface from the object, leaving substantially the soft interior portion. The apparatus also includes a housing enclosing the knife means to protect consumers or an operator of the apparatus from the knife means. The housing has two openings, one for receiving the object and one for discharging the soft interior portion after the object has been peeled.

For some objects to be peeled, such as pineapples, the hard external surface of the object has two end portions and an intermediate body portion. According to another aspect of the invention, the apparatus of the invention includes a first knife means and means for grappling the object and rotating it towards the first knife means for severing the two end portions of the external surface. The apparatus also includes a second knife means and means for urging the object towards the second knife means to sever the intermediate body portion of the external surface.

Yet another aspect of the invention is directed to a food package including the soft edible interior portion of a food object, where the interior portion was originally surrounded by a hard external surface of the food object, and where the external surface has been removed from the object by a knife means enclosed in a housing to protect consumers. The housing has a discharge opening for the interior portion for discharging the portion after the external surface has been removed. The food package also includes a receptacle containing the interior portion, the receptacle having been placed in a receiving position adjacent the discharging opening of the housing for receiving the interior portion after the removal of the external surface.

DETAILED DESCRIPTION OF THE INVENTION

Figure 1:
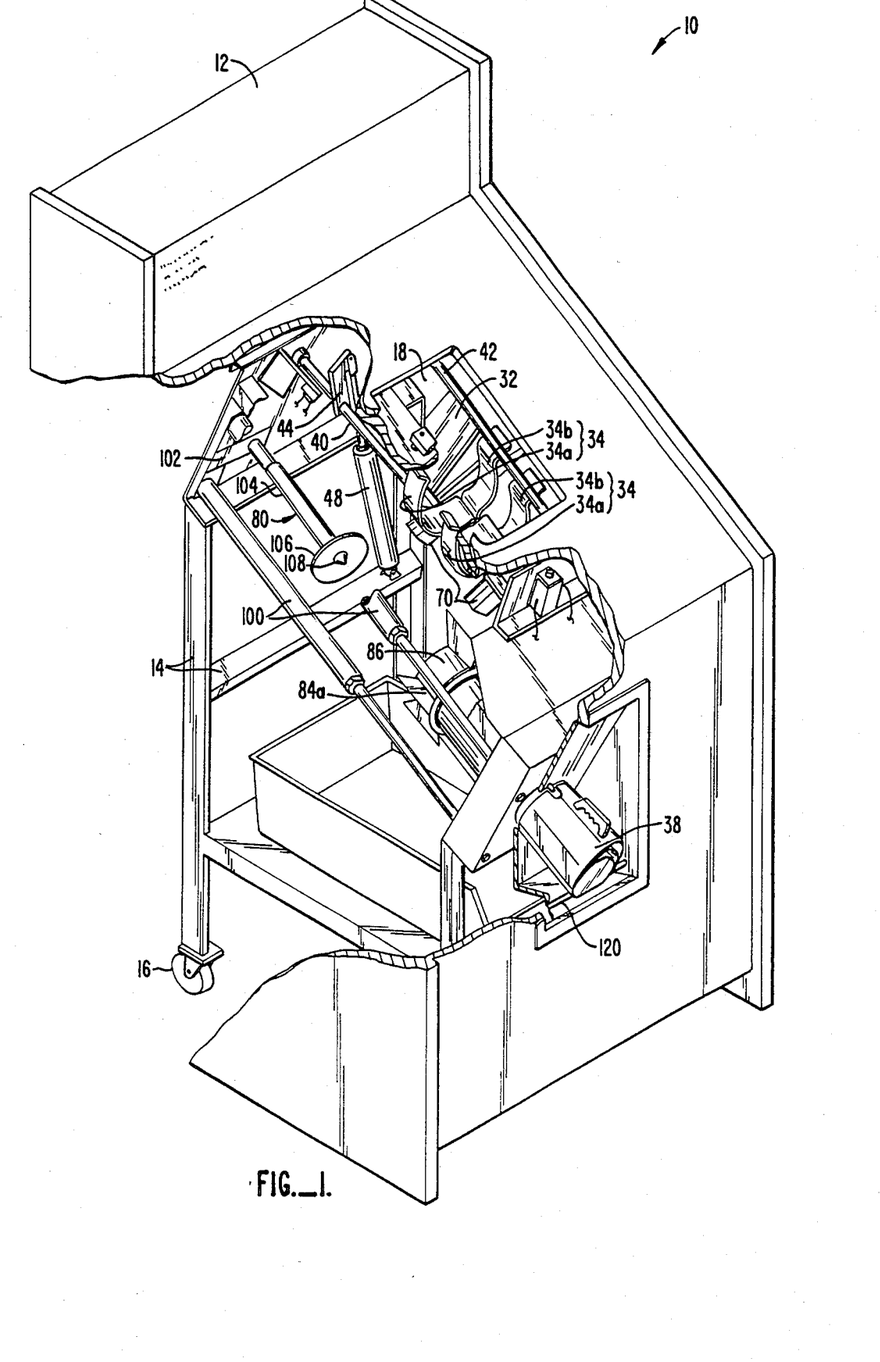
FIG. 1 is a perspective, partially cut away view of an apparatus for peeling a fresh fruit such as a pineapple to illustrate the preferred embodiment of the invention.

FIG. 1 is a perspective, partially cut away view of an apparatus for peeling objects to illustrate the preferred embodiment of the invention. The peeling apparatus 10 comprises a housing 12 for housing certain machinery for peeling an object. In FIG. 1, a part of housing 12 has been cut away to expose the machinery inside apparatus 10. For convenience in cleaning, maintenance and repair, such machinery may be mounted on a frame 14 sitting on wheels 16. When cleaning, maintenance or repair is desired the machinery may be rolled outside housing 12 and different parts of the machine can be conveniently reached. The machinery inside housing 12 includes knives for peeling the object and housing 12 encloses the entire machinery except for a receiving opening 18 and a discharge opening 20 more clearly shown in FIGS. 7A, 7B. Further safety features protect the consumers and operators from being accidentally injured through these two openings; these features will be described below after the peeling operation has been described in reference to FIGS. 2, 3A-3C and 4A, 4B.

The object to be peeled, such as a pineapple, is first deposited in the receiving opening 18 of FIG. 1. If a pineapple is deposited, preferably it is so deposited in opening 18 that its crown rests on a spring-loaded guard plate 32 and its body portion rests in two jaws 34. After the pineapple has been peeled, the peeled soft interior of the pineapple is discharged through opening 20 into a receptacle 38.

The hard external surface of the object to be peeled frequently has two end portions and an intermediate body portion. If the object to be peeled is a pineapple, for example, the crown and the butt are the two end portions, and the skin together with the eyes form an intermediate body portion of the external hard surface. In the preferred embodiment of the invention, the two end portions are first severed, and then the intermediate body portion. In the preferred embodiment the jaws 34 grapple the object to be peeled by its intermediate body portion towards the knives for peeling the two end portions. The jaws 34 rotate the object further, after the end portions have been severed, towards a position aligned with a second knife means. The object is urged towards the second knife means for severing the intermediate body portion of the external hard surface. The peeling operation is then complete, and the peeled object is then discharged into receptacle 38.

The mechanism for grappling the object to be peeled and the severing of the two end portions will now be described in reference to FIGS. 1, 2, 3A-3C. The grappling and rotating mechanism includes jaws 34, rod 40 on which the jaws are mounted, linkage 44 and piston 48 as best shown in FIGS. 3A-3C. As best shown in FIG. 3A, after the object to be peeled is deposited through the receiving opening 18, the object 50 is held in portions 34b of jaws 34. Rod 40 is rotatably connected to housing 12. Upon activation of the apparatus, piston rod 48a is retracted into the piston cylinder causing linkage 44 and rod 40 to rotate relative to the housing. Portions 34a of the jaws 34 are rigidly connected to rod 40 by a linkage 52 so that the rotation of rod 40 causes portions 34a to rotate also towards portions 34b of the jaws thereby closing the jaws as shown in FIG. 3B. Portions 34b of the jaws are rotatably connected to rod 40 through linkages 62, 64 and rod 66. Thus, as piston rod 48a is further retracted into the piston cylinder portions 34a, 34b of the jaws will rotate together with rod 40 causing the two end portions of object 50 to be severed by a pair of knives 70. In the preferred embodiment, the two knives 70 are substantially parallel to each other. Where the object to be peeled is a pineapple, knives 70 will sever the crown and butt portions of the pineapple.

Figure 4A:
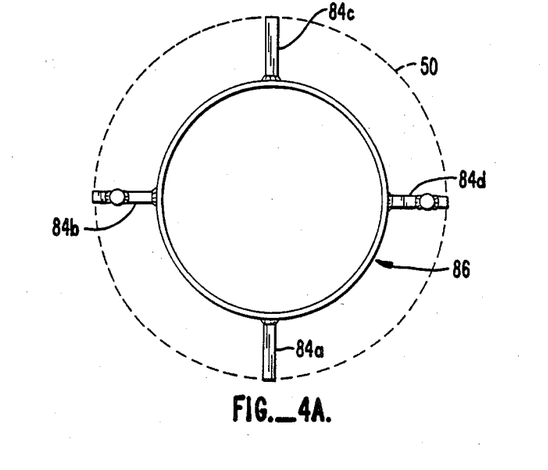
FIG. 4A is an enlarged, end view of the cylindrical knife means of the apparatus of FIG. 1.

After the two end portions of object 50 have been severed, piston rod 48a is still further retracted into the piston cylinder causing the jaws to further rotate the object into alignment between a plunger 80 and a second knife means comprising four straight knives 84a-84d and a cylindrical knife 86 as shown in FIG. 4A. The intermediate body portion of the external hard surface of the object is now ready to be severed.

The operation of the apparatus for peeling the intermediate body portion of the object will now be described in reference to FIGS. 1, 2, 4A, 4B and 5. As described above in reference to FIG. 3C, after the two end portions of the object have been severed, piston 48 causes jaws 34 to rotate the object further until it is aligned with plunger 80 and cylindrical knife 86. Plunger 80 then pushes the object towards cylindrical knife 86 and four straight knives 84a-84d, to sever the intermediate body portion of the hard external surface. To sever the intermediate body portion, two pistons 100 are caused to retract. The piston cylinders of the two pistons are connected at one end by a T-shaped bracket 102. Plunger 80 comprises a rod 104, a plate 106 and a centering protrusion 108. Rod 104 is connected to bracket 102 so that when pistons 100 retract bracket 102 and rod 104 are caused to move towards the cylindrical knife 86 and the straight knives 84a-84d. Plunger 80 urges the object towards the knives 84a-84d, 86, to sever the hard external surface of the object. Plate 106 supports the object as its external surface is severed by the knives and protrusion 108, together with plate 106, maintains the object in an aligned position relative to the knives so that only the hard external surface of the object will be severed. Cylindrical knife 86 is of such diameter that it severs, for objects with diameters within a certain range, the external hard surfaces. Knives 84a-84d further cut the intermediate body portion of the hard external surface into four pieces for easier disposal. The soft interior portion of the object then exits from end 86a of the cylindrical knife.

Figure 2:
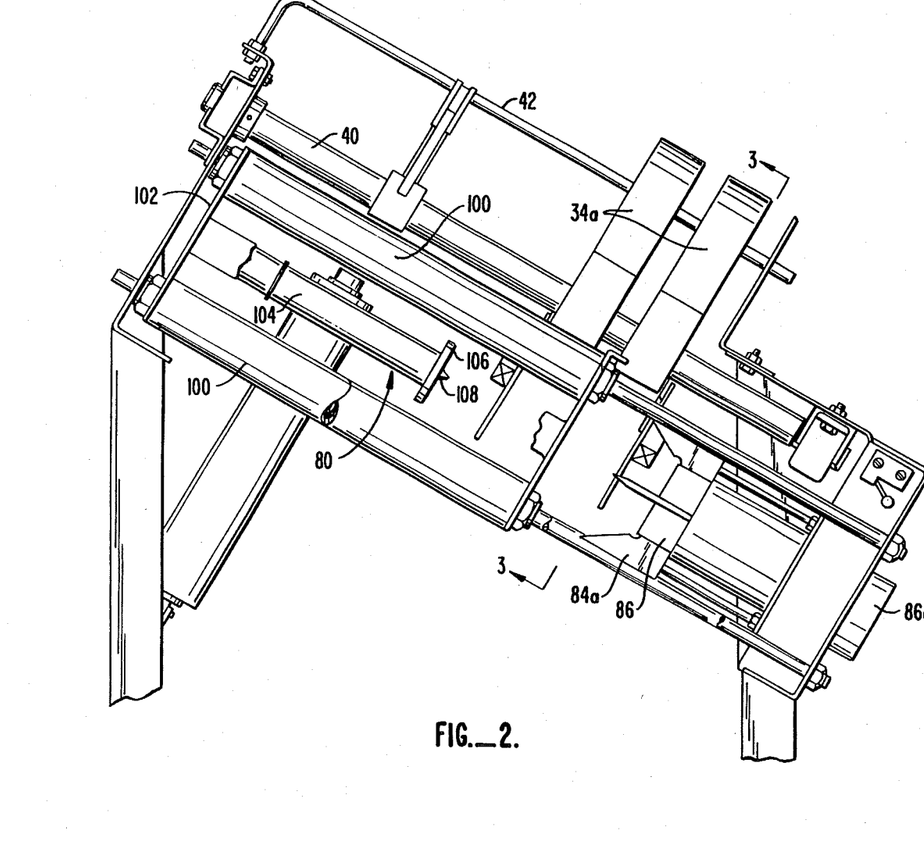
FIG. 2 is a partial, enlarged side view of the inside portion of the apparatus of FIG. 1.
Figure 3A:
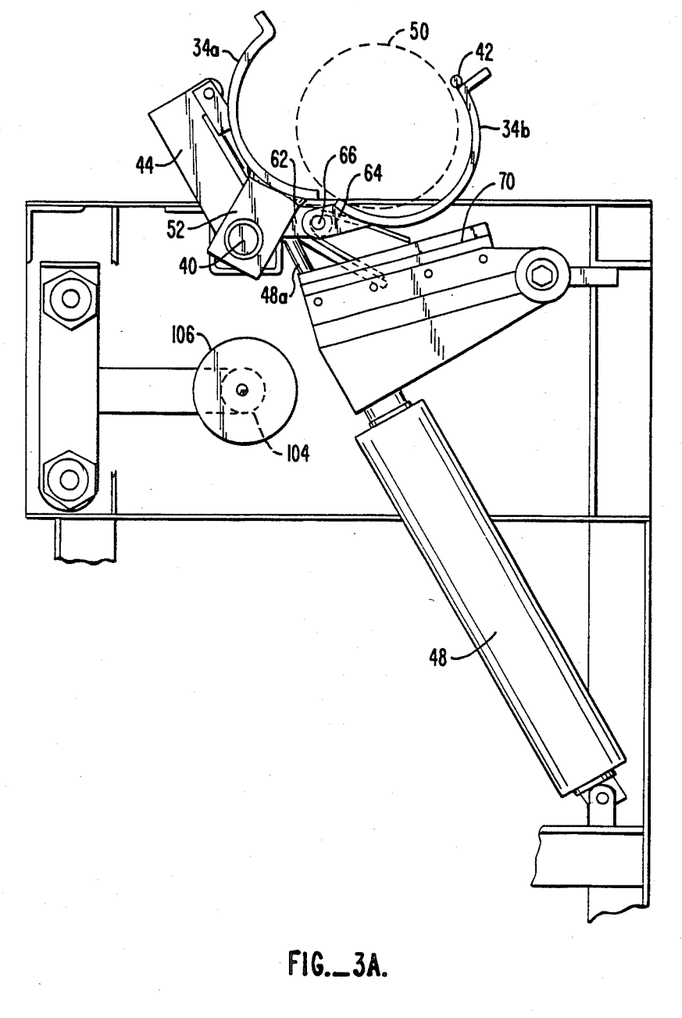
FIGS. 3A, 3B, 3C are views along the line 3—3 in FIG. 2 to illustrate the three different positions of certain portions of the apparatus of FIGS. 1 and 2 to illustrate the operation of the apparatus for peeling.
Figure 3B:
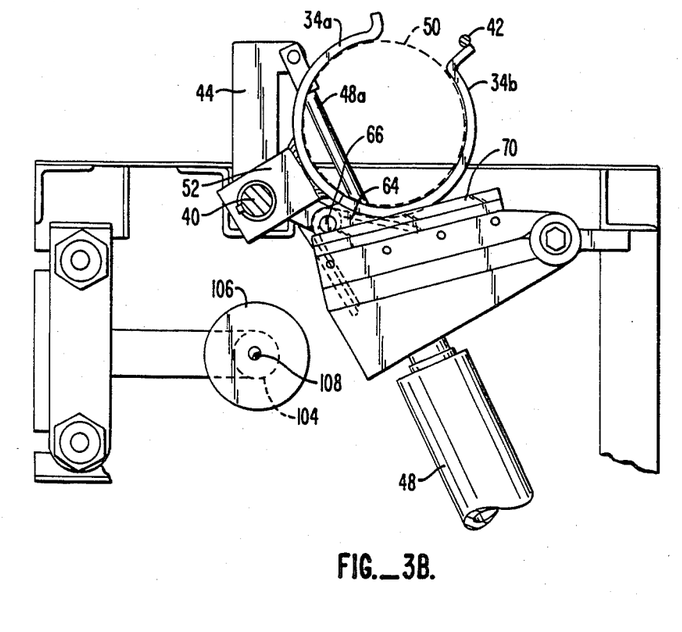
Figure 3C:
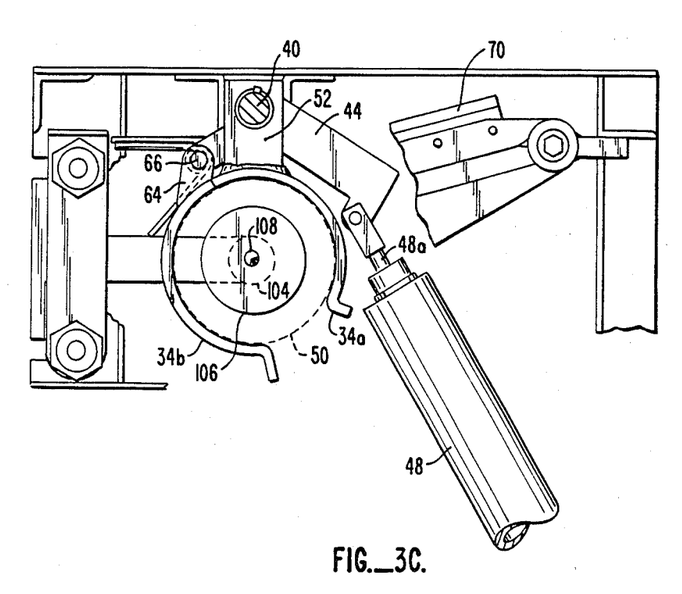
Figure 4B:
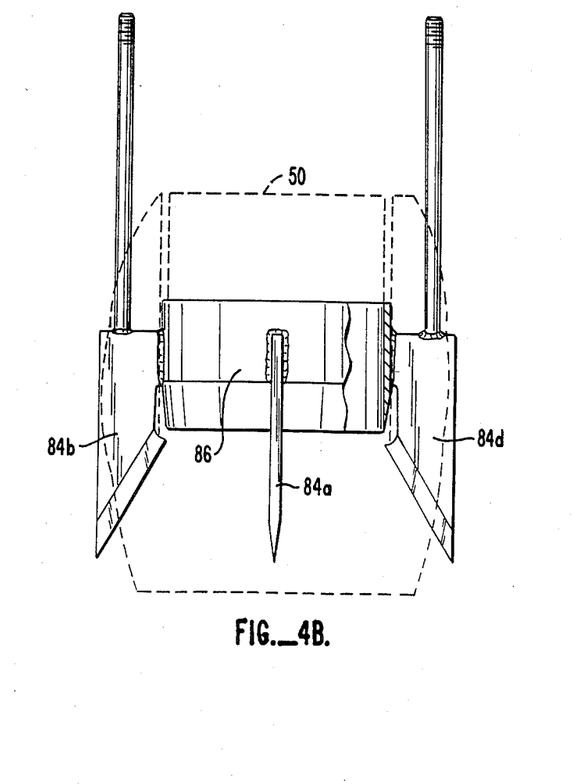
FIG. 4B is an enlarged, side view of the cylindrical knife means of FIG. 4A.

As shown in FIGS. 1 and 2, plunger 80 and cylindrical knife 86 are at an angle to the horizontal plane so that gravity aids the action of the plunger 80 in urging the object through the cylindrical knife for severing the intermediate body portion. FIGS. 4A and 4B show in more detail the construction of knives 86 and 84a-84d.

Figure 5:
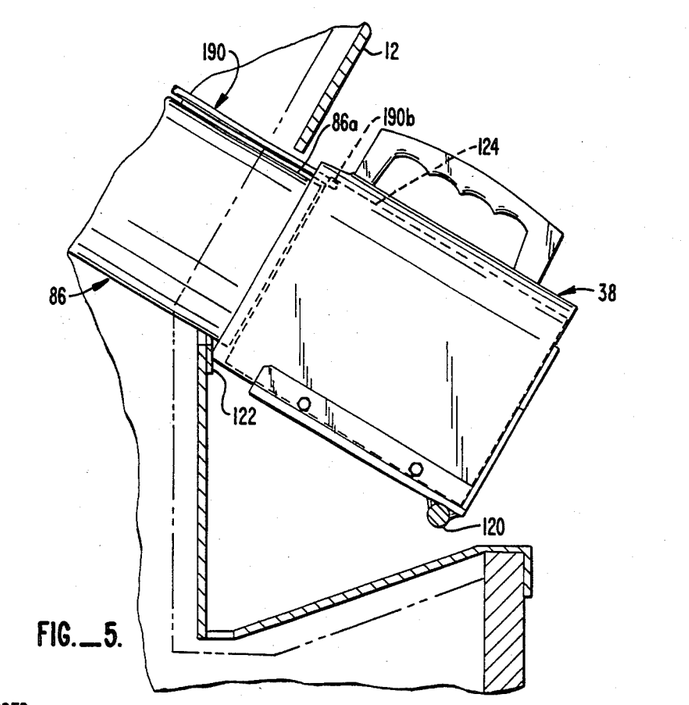
FIG. 5 is a side view of a portion of the apparatus of FIG. 1 showing the receptacle in a receiving position to illustrate the preferred embodiment of the invention.

The construction and structure of receptacle 38 will now be described in reference to FIGS. 1 and 5. Receptacle 38 is in a shape of a cup whose bottom is rotatably attached to housing 12 through a rod 120. Rod 120 may be attached to receptacle 38 by conventional means such as welding or by bolts and rod 120 is in turn rotatably connected to housing 12. Thus, receptacle 38 and rod 120 may be rotated substantially in a vertical plane towards or away from housing 12. When receptacle 38 is rotated towards housing 12 until it contacts a stopper 122, it is in a receiving position ready to receive the peeled soft interior portion of the object. When receptacle 38 is in the receiving position, end 86a of the cylindrical knife 86 protrudes for a short distance into receptacle 38 in the preferred embodiment. This reduces the likelihood that the soft interior portion, upon dropping into the receptacle, will cause spatter. After the soft interior portion has been discharged into the receptacle, the receptacle may be rotated away from housing 12, so that the soft interior portion may be retrieved and the peeling process is completed.

Figure 7A:
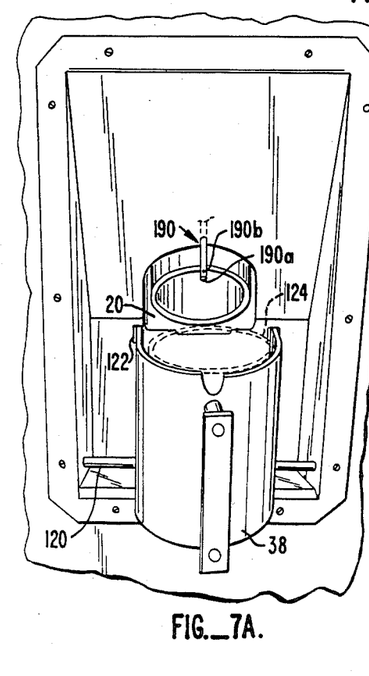
FIG. 7A is a front view of the discharge opening of the apparatus of FIG. 1, to illustrate the preferred embodiment of the invention.

For convenience of consumers in carrying the soft interior portions of fresh fruits such as pineapples, a second receptacle of a size which fits into receptacle 38 may be used. Thus, the second receptacle may be of a size that is made to fit receptacle 38, so that when the soft interior portion is discharged into the second receptacle placed beforehand in receptacle 38, the interior portion will be contained by the second receptacle and can be conveniently handled by the consumer. The second receptacle also prevents direct contact between the soft interior portion and receptacle 38. In such manner receptacle 38 remains free of spatter or juices from the peeled object. In this manner receptacle 38 need not be cleaned as frequently which reduces maintenance cost. As shown in FIG. 7A, the second receptacle 124, shown in dotted lines, is in the shape of a cup which fits inside receptacle 38. Cup 124 may be made of a conventional material such as hard plastic. Alternatively, the second receptacle may also be a soft container such as a plastic bag which is of a size that can line the inside surface of receptacle 38. All such configurations are within the scope of the invention.

Figure 6A:
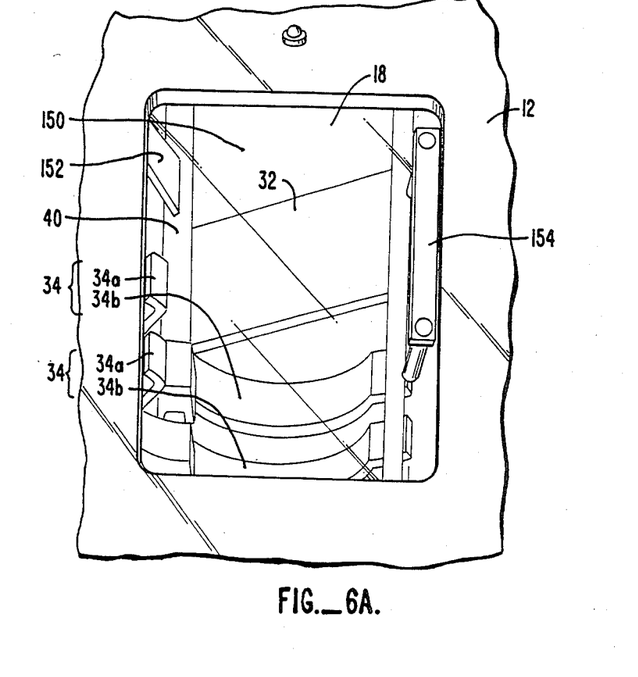
FIG. 6A is a top view of the receiving opening of the apparatus of FIG. 1 for receiving the object to be peeled, to illustrate a safety feature of the preferred embodiment of the invention.

Apparatus 10 is equipped with safety interlock features for protection of consumers and operators of the apparatus. Such safety interlock mechanism will now be described in reference to FIGS. 6A, 6B, 7A-7C and FIG. 8. FIG. 6A is a top view of the receiving opening 18 and a portion of housing 12. As shown in FIG. 6A the receiving opening 18 may be closed by a sliding door 150. Thus, sliding door 150 protects the consumers and the operator of the apparatus from reaching inside housing 12, causing injury. In the preferred embodiment, a sliding door is used to close opening 18. It will be understood, however, that other types of doors may be used to close opening 18 and are within the scope of the invention. When the apparatus is not in operation, door 150 is closed so that no one can reach through opening 18. As will be described later, the peeling process cannot proceed until door 150 is in a closed position. To deposit the object to be peeled through opening 18, an operator of the apparatus pushes the door 150 to the left in an open position, and the object may be deposited through opening 18. As shown in FIG. 6A, opening 18 is further blocked by jaws 34 and a guard plate 32 spring loaded (not shown) to urge it upwards. Thus, even when door 150 is in the open position, the operator's hand reaching into opening 18 will still be protected from the parallel knives 70 by jaws 34 and a spring loaded guard plate 32. When rod 40 is rotated causing the jaws 34 to close, a rotating guard plate 152 connected to rod 40 rotates together with the rod and urges guard plate 32 downwards, against the urging of the spring urging guard plate 32 upwards. This causes the object to be peeled to be rotated downwards past guard plate 32 for severing the two end portions as described above.

Figure 6B:
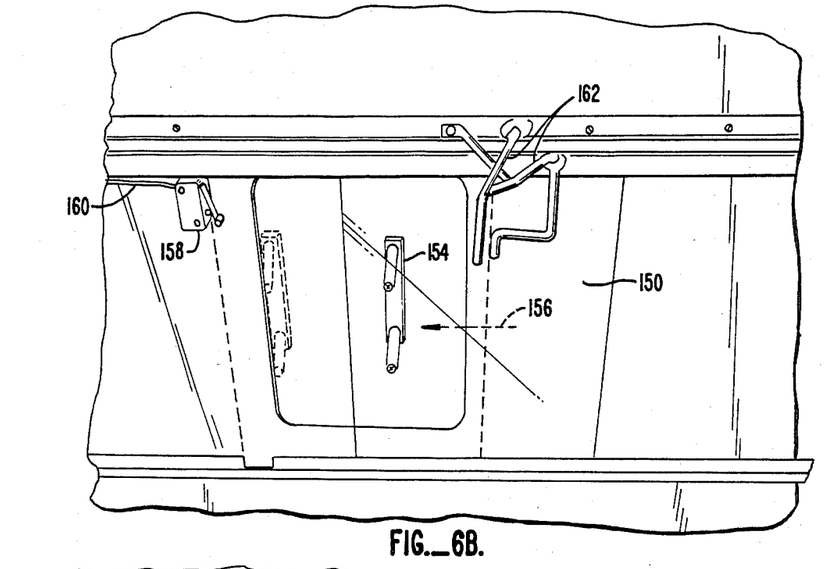
FIG. 6B is a perspective bottom view of the receiving opening of FIG. 6A, viewing the opening from the inside of the apparatus.

FIG. 6B is a perspective view of the sliding door 150 and the associated portions of apparatus 10 viewed from below inside housing 12. FIG. 6B shows sliding door 150 in a half open position. When door handle 154 is pushed along direction 156 as shown in FIG. 6B until it is in the closed position as shown by dotted lines, the door contacts a detector 158 causing a signal to be sent along line 160. Detector 158 therefore detects whether door 150 is in a closed position. As described below, the mechanism for peeling the object will not operate until detector 158 detects the door in a closed position and sends a signal along line 160. Once the door is closed, a conventional mechanism 162 keeps the door in a closed position until the peeling process has been completed.

Figure 7B:
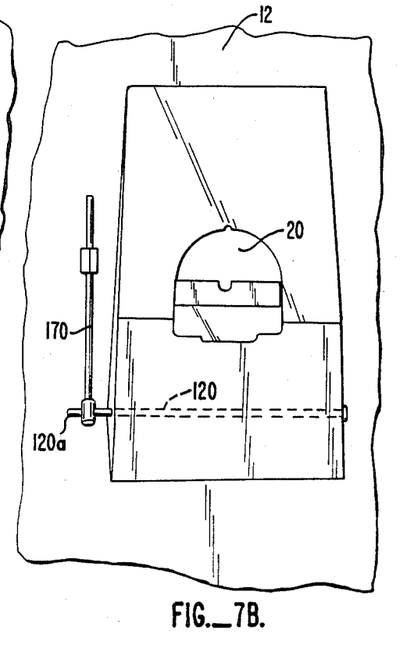
FIG. 7B is a view of the discharge opening of FIG. 7A, viewing the opening from the inside of the apparatus.
Figure 7C:
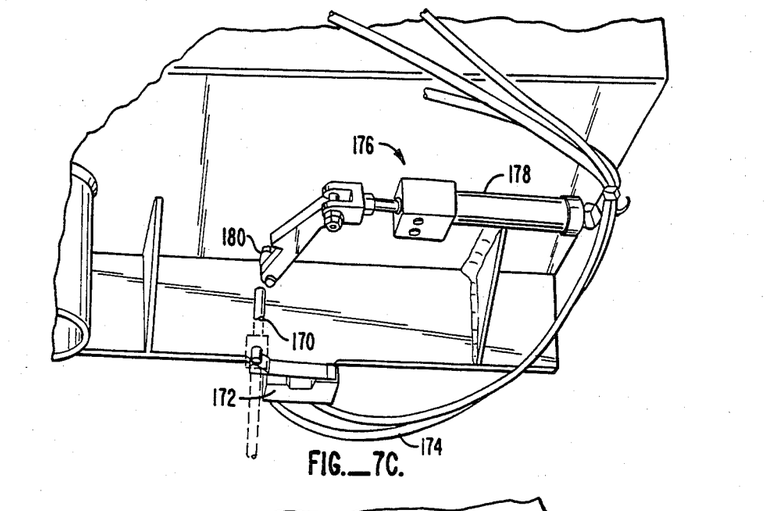
FIG. 7C is a perspective view of a locking mechanism for locking a receptacle for receiving the discharged peeled object.

In the preferred embodiment, the mechanism for peeling the object described above will not operate until it is detected that receptacle 38 is in the receiving position and further that a second receptacle 124 is in place in receptacle 38 for receiving the peeled soft interior portion. Such feature will now be described in reference to FIGS. 5, 7A-7C and FIG. 8. As shown in FIG. 7B, rod 120 to which receptacle 38 is attached has a portion inside housing 12 labeled 120 a. Portion 120 a is attached to rod 170 so that when the receptacle 38 is rotated into the receiving position as shown in FIG. 5, rod 170 is rotated downwards until it contacts a second detector 172 shown in FIG. 7C. Detector 172 is located inside housing 12 near end 86a of knife 86 in FIG. 2. Detector 172 sends a signal along line 174 indicating that the receptacle 38 is in the receiving position. When the signal from detector 172 is detected, a pneumatic or hydraulic locking mechanism 176 is triggered which locks bar 170 into place so that the receptacle 38 cannot be rotated away from housing 12 until the peeling process has been completed. Locking mechanism 176 includes a piston 178 and a hook mechanism 180. Upon detection of a signal from detector 172, piston 178 causes hook 180 to be rotated downwards to keep rod 170 into position in contact with detector 172 and to keep the receptacle in the receiving position. Locking mechanism 176 may be one of many conventional types of locking mechanisms. The peeling mechanism described above will not operate until detector 172 sends a signal along line 174. Therefore, until receptacle 38 is in the receiving position, the peeling mechanism will not operate As discussed above, it is preferable to insert a second receptacle 124 into receptacle 138 for the convenience of consumers in carrying away the peeled fruit and for easier maintenance. For this reason it is desirable to prevent the operation of the peeling mechanism until it is detected that a second receptacle 124 is also in position within receptacle 38. To detect such condition a third detector 190 is used. As shown in FIGS. 5 and 7A illustrating the preferred embodiment, the third detector comprises a fluid restrictor 190 which includes a tube with a pressurized fluid therein. Air restrictors have been found to be satisfactory for restrictor 190. The tube is closed at its end 190a but has a hole on the side 190b facing the inside surface of the second receptacle 124. Receptacle 38 is shaped such that it has a notch adjacent to hole 190b. Fluid restrictor 190 is located above end 86a of the cylindrical knife and at such location that the second receptacle 124, when in place, will cover hole 190b. Thus, when the second receptacle 124 is placed in receptacle 38 and receptacle 38 is rotated until it is in the receiving position, receptacle 124 will cover hole 190b causing a change in fluid pressure in restrictor 190, causing the restrictor to generate a signal to so indicate.

When signals are detected indicating that the sliding door 150 is closed, that the receptacle 38 is in the receiving position, and that a second receptacle 124 is in place in receptacle 38, the peeling mechanism described above is then automatically activated. When receptacle 38 is in the receiving position but no second receptacle 124 is inside receptacle 38, the notch in receptacle 38 will leave hole 190b exposed so that the pressure in restrictor 190 will not increase. No signal will therefore be generated by restrictor 190 to operate the peeling mechanism.

Figure 8:
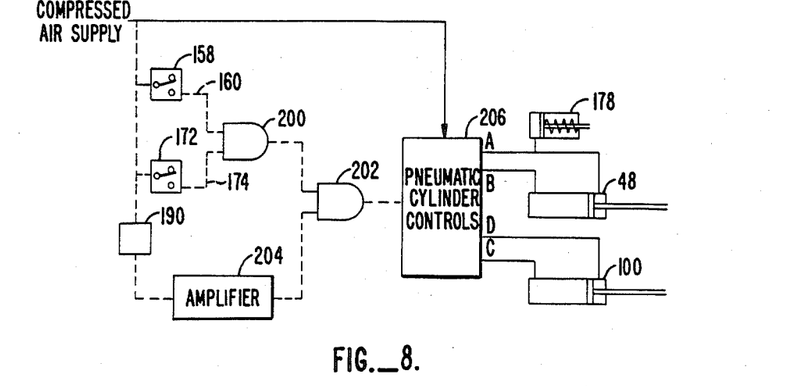
FIG. 8 is a circuit diagram of a circuit which responds to certain safety conditions of the apparatus of FIG. 1 for controlling and automatically operating the peeling mechanism of the apparatus.

FIG. 8 is a schematic circuit diagram for automatically actuating the peeling mechanism upon detection of signals from the three detectors 158, 172 and 190. In the preferred embodiment detectors 158 and 172 are pneumatic switches. AND-gates 200, 202 and amplifier 204 are all pneumatic devices. Thus, when detectors 158, 172 detect that the sliding door is in a closed position and that receptacle 38 is in the receiving position they generate pneumatic signals through lines 160 and 174 which are supplied to AND-gate 200. Upon receiving signals from both detectors, AND-gate 200 will generate a pneumatic signal to an input of AND-gate 202. When the fluid restrictor 190 senses a pressure increase, it provides a pneumatic signal which is amplified by amplifier 204. The amplified signal is supplied to the other input of AND-gate 202. Therefore, when the sliding door is closed, when receptacle 38 is in the receiving position, and when the second receptacle 134 is also in position in receptacle 38, AND-gate 202 will provide a pneumatic signal to a pneumatic cylinder control 206. Such signal will cause control 206 to pressure port A which extends cylinder 178 to lock bar 170 and receptacle 38 in the receiving position. This also retracts cylinder 48 of FIGS. 1-3C. The retraction of piston 48 causes the object to be rotated by the jaws 34 to sever the end portions and to align the object with a plunger and cylindrical knife as described above. After piston 48 is retracted, port D is pressurized to contract cylinders 100. The retraction of cylinders 100 causes the plunger 80 to urge the object towards the cylindrical and straight knives as described above to sever the intermediate body portion of the external surface.

After cylinder 100 has been retracted, port D is depressurized and port C is pressurized to return cylinder 100 to its normal position. This causes the plunger 80 to be moved upwards, returning it to its position in FIGS. 1 and 2. Then port A is depressurized and port B is pressurized, returning cylinders 48 and 178 to their normal positions. Cylinder 48 then extends, causing jaws 34 and rod 40 to be rotated until they are in positions as shown in FIGS. 1 and 2, ready for the next cycle. This also causes cylinder 178 to be retracted. The retraction of cylinder 178 causes hook 180 to be rotated upwards thereby freeing rod 170 and receptacle 38. Receptacle 38 can then be rotated away from housing 12 for retrieval of the peeled object inside.

End 86a of the cylindrical knife is blunt so that an operator reaching into the area of the receptacle 38 will not be accidentially injured thereby.

In the preferred embodiment described above, detectors 158, 172 and 190 are all pneumatic devices. The circuit components of FIG. 8 are all pneumatic devices so that no electrical connections are used in apparatus 10. This is advantageous since pneumatic devices are less prone to breakdowns caused by electrical shorts or misconnections and are therefore more suitable for use in consumer related devices. For this reason the machinery inside housing 12 may be easily cleaned by simply rolling it out of the housing on wheels 16 and spraying the machinery using a water hose. Since no electrical connections are involved, such cleaning method can be conveniently used without undue risks of electrical shorts. It will be understood, however, that other types of control and automatically actuating mechanisms may also be used and are within the scope of the invention. For example, cylinders 48, 100, 178 and control system 204 may be hydraulically operated. In such event detectors 158, 172 may be simple electrical switches. Detector 190, instead of being a fluid restrictor, may be an optical detector such as the LED fiberoptic detector provided by Banner Electric Company. The AND-gate 200 and 202 and amplifier 204 are electrical devices and LED fiberoptic detector detects the presence of the second receptacle as follows: the detector is connected to a fiberoptic cable having two optical fibers, one for transmitting light to the detector and one for transmitting the light detected by the LED detector. If the second receptacle 124 is in place, the light transmitted by the transmitting optical fiber will be reflected towards the detector. The detector detects the light and sends back a light signal in the receiving optical fiber. Such light signal reflected will then cause an electrical signal to be generated in a conventional manner to so indicate. Such configuration and other various configurations which may be used are all within the scope of the invention.

In the above description, the sliding door 150, receptacle 38 and container 124 all have to be in place before the peeling process will proceed. It will be understood, however, that these three features are not interdependent and any one of them may be used alone or in conjunction with any other of the features. In such event, FIG. 8 needs to be modified slightly. Thus if the peeling process may start even though container 124 is not in place, amplifier 204 and AND-gate 202 are eliminated and control 206 responds directly to signals from AND-gate 200. Similar changes may be made if the peeling process may start without the sliding door or receptacle 38 in place.

The above description of the construction and method is merely illustrative thereof and various changes in the details of the construction, design and other details may be within the scope of the appended claims.

We claim:

1. A method for peeling a fresh fruit having a generally soft interior portion surrounded by a generally hard external surface by means of a peeling apparatus, said peeling apparatus including (a) knife means for removing the hard external surface from said fruit, leaving substantially the soft interior portion, (b) a housing enclosing said knife means, said housing having two openings, one for receiving the fruit, and one for discharging said soft interior portion after said fruit has been peeled, (c) a door connected to the housing in such manner that when the door is in an open position, the opening for receiving the fruit is substantially unobstructed and when the door is in a closed position, it closes the opening for receiving the fruit, (d) a receptacle for receiving said soft interior portion of the fruit discharged from the discharging opening of the housing after peeling, (e) means in said housing for causing relative movement between said fruit and said knife means, said relative movement being such that the external surface is removed from the fruit by said knife means, and (f) sensing and activating means for sensing whether said door is substantially in the closed position, for sensing whether said receptacle is in said receiving position, and for automatically activating said movement causing means to remove the external surface after sensing both that the door is substantially in the closed position and that the receptacle is in the receiving position, said method comprising:

depositing the fruit through the receiving opening of the housing;
closing the door and placing the receptacle in the receiving position, thereby causing the sensing and activating means to activate the relative movement causing means to cause relative movement between the fruit and said knife means to remove the external surface from the fruit; and discharging the interior portion of the fruit into the receptacle.

2. The method of claim 1, wherein said receptacle is rotatably connected to the housing so that when the receptacle is rotated towards the housing until its open end contacts the housing, the receptacle is in the receiving position to receive the interior portion discharged from the discharging opening of the housing, and wherein said receptacle placing step comprises rotating the receptacle until its open end contacts the housing.

3. The method of claim 1, wherein said receptacle defines a first receptacle, said peeling apparatus further including a second receptacle which fits inside the first receptacle so that, when the interior portion is discharged, it will be deposited in the second receptacle without coming into direct contact with the first receptacle, said sensing and activating means also senses whether said second receptacle is in the first receptacle ready to receive the interior portion and wherein said sensing and activating means will not activate the movement causing means until it senses that the second receptacle is in such a position, said method further comprising the step of placing a second receptacle in the first receptacle before the step of closing the door and placing the first receptacle into the receiving position.

* * * * *